United States Patent
Li et al.

(10) Patent No.: US 8,136,366 B2
(45) Date of Patent: Mar. 20, 2012

(54) METHOD, SYSTEM AND HARDWARE DEVICE FOR TEMPERATURE CONTROL

(75) Inventors: Gaoqiang Li, Beijing (CN); Chizhou Ma, Beijing (CN); Xiaosong Liu, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 561 days.

(21) Appl. No.: 12/349,306

(22) Filed: Jan. 6, 2009

(65) Prior Publication Data

US 2009/0175004 A1 Jul. 9, 2009

(30) Foreign Application Priority Data

Jan. 7, 2008 (CN) .......................... 2008 1 0055692

(51) Int. Cl.
 F25D 23/12 (2006.01)
 F28D 15/00 (2006.01)
 F24F 11/053 (2006.01)
 G06F 1/20 (2006.01)
 H05K 7/20 (2006.01)

(52) U.S. Cl. .................. 62/259.2; 165/104.33; 236/1 C; 361/679.48; 361/695

(58) Field of Classification Search ................ 62/259.2; 165/104.33, 80.3; 236/1 C; 361/695, 679.48, 361/697; 713/330

See application file for complete search history.

(56) References Cited

U.S. PATENT DOCUMENTS

2003/0023887 A1 * 1/2003 Maciorowski et al. ....... 713/300

* cited by examiner

*Primary Examiner* — Chen Wen Jiang
(74) *Attorney, Agent, or Firm* — Dickstein Shapiro LLP

(57) ABSTRACT

The invention provides a temperature control method, system and hardware device, wherein, the method comprising: after the system logs in operation system, a temperature control function module obtains a temperature-control control right, and controls the system temperature based on predefined first temperature control strategy; if it is determined that the temperature control function module is at fault and stops working, a temperature control hardware device obtains the temperature-control control right, and controls the system temperature based on predefined second temperature control strategy. The system comprises a temperature control hardware device and a temperature control function module. The temperature control hardware device comprises: a temperature detecting unit, a fan detecting unit, a temperature control logic unit and a timing unit, wherein the timing unit periodically determines if the temperature control function module based on operation system works normally, and if fault occurs in the temperature control function module, activates the temperature control logic unit. The above technical solution can achieve better temperature control effect and improve the system reliability as a whole.

13 Claims, 3 Drawing Sheets

101 AFTER THE SYSTEM LOGS IN OPERATION SYSTEM, THE TEMPERATURE CONTROL FUNCTION MODULE OBTAINS THE TEMPERATURE-CONTROL CONTROL RIGHT, AND CONTROLS THE SYSTEM TEMPERATURE BASED ON A PREDEFINED FIRST TEMPERATURE CONTROL STRATEGY

102 IF IT IS DETERMINED THAT FAULT OCCURS IN THE TEMPERATURE CONTROL FUNCTION MODULE, TEMPERATURE CONTROL HARDWARE DEVICE OBTAINS THE TEMPERATURE-CONTROL CONTROL RIGHT, AND CONTROLS THE SYSTEM TEMPERATURE BASED ON A PREDEFINED SECOND TEMPERATURE CONTROL STRATEGY

FIG. 1

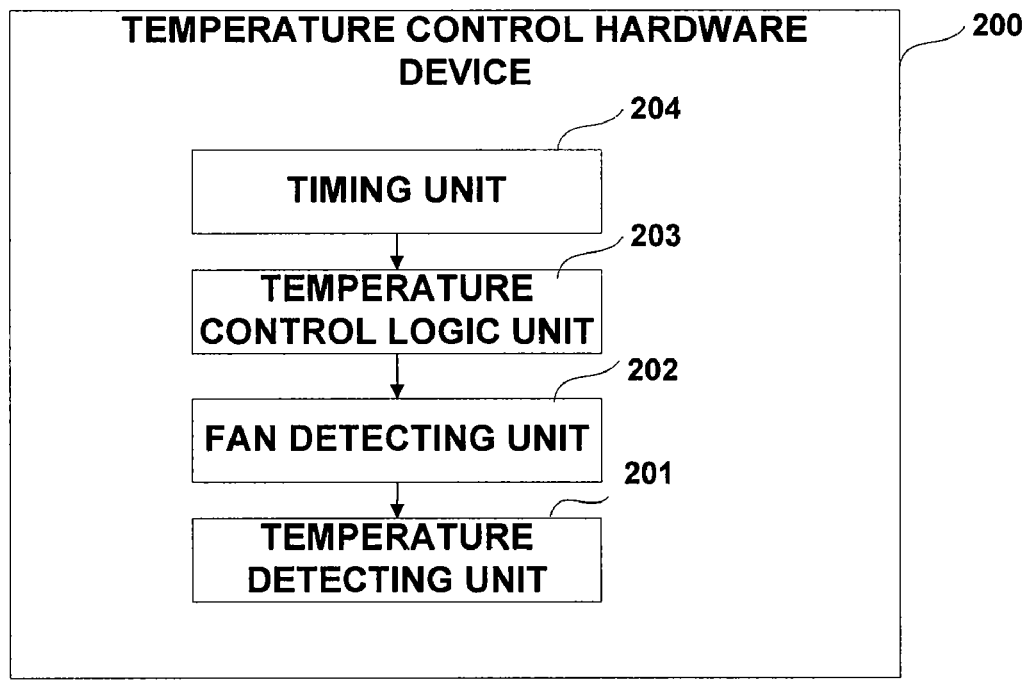

FIG. 2

METHOD, SYSTEM AND HARDWARE DEVICE FOR TEMPERATURE CONTROL

BACKGROUND OF THE INVENTION

1. Field of the Invention

The invention relates to temperature control technology, and more particularly to a method, system and hardware device for temperature control.

2. Description of the Prior Art

The conventional electronic products, such as computer products, generally use active fan heat dissipation mode to dissipate the heat so as to satisfy the system heat dissipation. But the level of system noise may be increased inevitably because of the fan. Typically, the higher the fan speed is, the higher the noise will be. In order to reduce system noise while achieving heat dissipation and to be environment friendly, the conventional computer products, such as desktop computers, generally are designed to control temperature by setting a fan speed control design. With the temperature control design, when system load or environment temperature is high, the fan is controlled to increase the speed to satisfy the system heat dissipation; when system load or environment temperature is low, the fan is controlled in the system for heat dissipation to be low-speed by specific software and hardware design to reduce the noise while satisfying the system heat dissipation.

Currently, typical temperature control methods include:

1) Super I/O or EC method. It controls temperature by temperature detecting circuit, fan speed control circuit and temperature control logic unit integrated with mainboard Super I/O, EC chip or chipset. This method has the advantage of high real time peculiarity. But limited by the performance, it can only achieve simple functions. If the configuration of the product is changed, it is easy to modify the strategy of temperature control.

2) Windows temperature control software control method. Temperature control software accesses temperature detecting circuit, fan speed control circuit integrated with Super I/O chip, EC chip or chipset, to control temperature control logic unit so as to control temperature. This method may make use of high computing capability of Windows software, and perform more complex and intelligent temperature control algorithm, but is affected by operation system reliability. There is the risk of system overheating due to the invalidation of temperature control once the operation system crashes.

SUMMARY OF THE INVENTION

A temperature control method, system and hardware device are provided according to the embodiments of the present invention, to achieve better temperature control effect and improve system reliability.

In order to achieve the above purpose, in one aspect, a temperature control method is provided, which comprises steps as follows:

after the system logs in operation system, the temperature control function module obtains the temperature-control control right and controls the system temperature based on a predefined first temperature control strategy;

if it is determined that fault occurs in the temperature control function module, the temperature control hardware device obtains the temperature-control control right and controls the system temperature based on a predefined second temperature control strategy.

Preferably, according to the method, the determination is performed by setting and detecting a temperature-control control right identifier, which identifies the obtainer of the temperature-control control right.

Preferably, according to the method, the determination comprises:

setting the temperature-control control right identifier to be of at least two different values, corresponding to that the temperature-control control right is or isn't obtained by the temperature control function module respectively;

if the temperature control function module obtains the temperature-control control right, setting the value of the temperature-control control right identifier to correspond to that the temperature-control control right is obtained by the temperature control function module;

after the temperature control function module obtains the temperature-control control right, setting the value of the temperature-control control right identifier to correspond to that the temperature-control control right is obtained by the temperature control function module periodically based on a predefined first period;

based on a predefined second period, the temperature control hardware device periodically detects the value of the temperature-control control right identifier; if the value of the temperature-control control right identifier corresponds to that the temperature-control control right isn't obtained by the temperature control function module, it is determined that fault occurs in the temperature control function module;

wherein the first period is less than the second period.

Preferably, according to the method, if the value of the temperature-control control right corresponds to that the temperature-control control right is obtained by the temperature control function module, the value of the temperature-control control right identifier is set to correspond to that the temperature-control control right is not obtained by the temperature control function module.

Preferably, according to the method, after determining that fault occurs in the temperature control function module, the second temperature control strategy is activated to control the system temperature.

In another aspect, a temperature control system is provided, comprising: a temperature control hardware device and a temperature control function module based on operation system, wherein the temperature control function module is for obtaining the temperature-control control right after operation system is logged in, and controlling the system temperature on a predefined second temperature control strategy;

the temperature control hardware device is for obtaining the temperature-control control right when it is determined that fault occurs in the temperature control function module, and controlling the system temperature based on a predefined second temperature control strategy.

In a further aspect, a temperature control hardware device is provided, comprising:

a temperature detecting unit for detecting system temperature;

a fan detecting unit for detecting fan speed;

a temperature control logic unit for adjusting the fan speed on detected temperature, fan speed and a predefined second temperature control strategy;

a timing unit for periodically determining if fault occurs in the temperature control function module based on operation system; and for activating the temperature control logic unit if fault occurs in the temperature control function module.

The above technical solution has such technical effects:

The above technical solution can perform more complex and intelligent temperature control algorithm; achieve better temperature control effect by using the temperature control function module based on operation system, such as Windows operation system to control temperature. In addition, when the temperature control function module malfunctions, it may use the temperature control hardware device to take over the temperature-control control right to control system temperature, so as to improve the system reliability as a whole and avoid the risk of system overheating due to the invalidation of temperature control when the temperature control function module stops working because of malfunction, such as the operation system breakdown. It ensures system safety.

BRIEF DESCRIPTION OF THE DRAWINGS

FIG. 1 is a schematic flow chart of the temperature control method according to one embodiment of the present invention;

FIG. 2 is a schematic structure diagram of the temperature control hardware device according to one embodiment of the present invention;

DETAILED DESCRIPTION OF THE PREFERRED EMBODIMENTS

Figure 3:
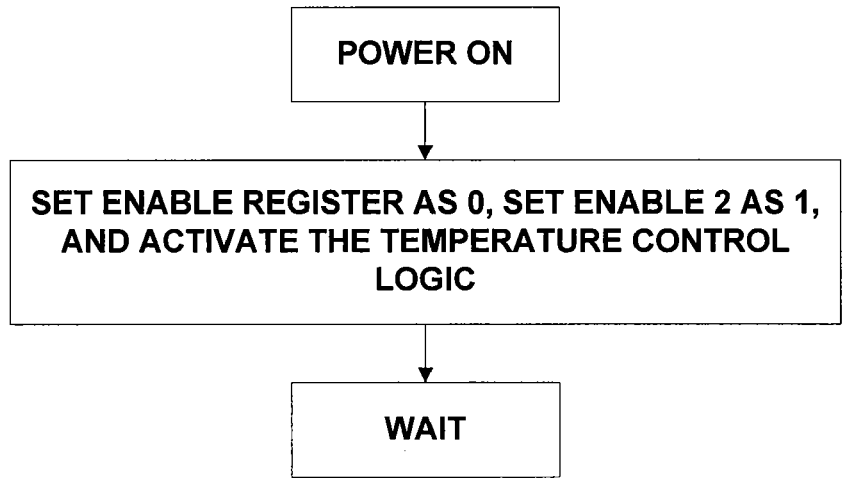
FIGS. 3 and 4 are schematic flow charts within the temperature control hardware device in the temperature control method according to another embodiment of the present invention.

The technical problem, technical solution and advantages of embodiments of the invention will become readily apparent from the detailed description that follows, with reference to the accompanying drawings and specific embodiments.

FIG. 1 is a schematic flow chart of the temperature control method according to one embodiment of the present invention. As shown in FIG. 1, the temperature control method of one embodiment of the present invention comprises:

Step 101, after the system logs in the operation system, the temperature control function module obtains the temperature-control control right, and controls the system temperature based on predefined first temperature control strategy.

Step 102, if it is determined that fault occurs in the temperature control function module, the temperature control hardware device obtains the temperature-control control right, and controls the system temperature based on predefined second temperature control strategy.

In embodiments of the invention, the temperature control function module may be implemented by software. The temperature control hardware device may be implemented by chips.

In the embodiment, the first temperature control strategy and the second temperature control strategy may be the same or different from each other. Generally, because the temperature control function module based on operation system, such as the temperature control function module based on Windows operation system, has high computing capability, and is capable of performing more complex and intelligent computing, the second temperature control strategy is a bit more complex and intelligent than the first one, so as to control the temperature more effectively. Exemplarily, the first temperature control strategy and the second temperature control strategy may include: adjust the fan speed based on the system temperature and load; increase the fan speed when the system temperature or load is high and decrease the fan speed when the system temperature or load is low so as to satisfy the system requirement of heat dissipation and reduce the system noise effectively.

Preferably, the embodiment of the invention also comprises steps as follows:

Set a temperature-control control right identifier for identifying the obtainer of the temperature-control control right to be of at least two different values, corresponding to that the temperature-control control right is or isn't obtained by the temperature control function module, respectively.

Set the value of the temperature-control control right identifier to correspond to that the temperature-control control right is obtained by the temperature control function module when the temperature control function module obtains the temperature-control control right;

After the temperature control function module obtains the temperature-control control right, set the value of the temperature-control control right identifier to correspond to that the temperature-control control right is obtained by the temperature control function module periodically based on a predefined first period;

Based on a predefined second period, the temperature control chip periodically detects the value of the temperature-control control right identifier. If the value of the temperature-control control right identifier corresponds to that the temperature-control control right isn't obtained by the temperature control function module, it is determined that fault occurs in the temperature control function module. The second temperature control strategy is activated to control the system temperature. If the value of the temperature-control control right identifier corresponds to that the temperature-control control right is obtained by the temperature control function module, the value of the temperature-control control right identifier is changed to the one corresponding to that the temperature-control control right isn't obtained by the temperature control function module. Wherein, the first period is less than the second period. Preferably, the first period is less than the half of the second period so as to ensure that the temperature control logic within the temperature control chip does not work when the temperature control function module operates normally.

FIG. 2 is a schematic structure diagram of the temperature control hardware device according to one embodiment of the present invention. In the embodiment, the temperature control hardware device may be implemented by chips, for example, Super I/O chip, Embedded Controller chip, or other chips which can implement the temperature control. As shown in FIG. 2, the temperature control hardware device 200 implementing the embodiment of the invention includes: a temperature detecting unit 201 for detecting the system temperature; a fan detecting unit 202 for detecting fan speed; a temperature control logic unit 203 for adjusting the speed of the fan based on detected system temperature, fan speed and predefined second temperature control strategy; a timing unit 204 for periodically determining if the temperature control function module based on operation system works normally, and for activating the temperature control logic unit if the temperature control function module is at fault. Exemplarily, when the temperature control chip is an I/O chip, it communicates with external circuits via interface bus.

Exemplarily, the temperature control detecting unit can be implemented by one or more temperature detecting circuits. Corresponding temperature detecting registers may be set in the temperature control chip for storing the detected temperature. The fan detecting unit can be implemented by one or more fan speed control circuits. Corresponding fan speed detecting and control registers may be set in the temperature control chip. The predefined second temperature control strategy in the temperature control logic unit may be simple temperature control algorithm, such as the temperature control algorithm that increases fan speed when the detected temperature is high and decreases fan speed when the detected temperature is low. A timing unit, which may be a logic circuit or be implemented by embedded function module, such as embedded software, includes at least two registers or embedded program variables that can be read and written: a control right identifier (Enable) and a chip time interruption timing period. "Enable" is the temperature-control control right identifier, wherein 0 represents that the temperature control hardware device, such as Super I/O chip, has the control right, while 1 represents that the Windows function module has the control right. A timing period is the interval at which the temperature control hardware device, such as temperature control I/O chip, scans Enable register, and the timing period at which the temperature control chip scans the Enable register can be set as the second period. The timing unit periodically detects the Enable parameter according to the setting of the timing period. If the parameter is 1, it is determined that the temperature control function module works normally, and the temperature control chip resets it as 0. If the parameter is 0, it is determined that the temperature control function module occurs fault, i.e., it is out of the way and does not work, and the temperature control chip activates the temperature control logic unit of the chip according to the predefined temperature control parameter, using the second temperature control strategy predefined in the chip to control the system temperature. Obviously, the values of the Enable parameter are not limited to 1 and 0, which are only examples, but can also be other values as long as the values include at least two different values and can identify if the temperature-control control right belongs to the temperature control function module or the temperature control hardware device.

In a temperature control method according to another embodiment of the invention, the temperature control hardware device, such as the temperature control chip, includes the above control right identifier (Enable) and chip time interruption timing period register, as well as chip temperature control logic startup identifier register (Enable 2), and the different values of Enable2 identify if the temperature control logic unit in the temperature control chip is activated. Exemplarily but not limited, it is set that the temperature control logic unit shuts down in the case that the value of Enable 2 is 0, and the temperature control logic unit is activated in the case of 1. Certainly, other different values may also identify the two conditions.

A temperature control method according to another embodiment of the invention includes steps as follows:

Step a, after the system powers on but before logging in operation system, the temperature control chip takes over the temperature-control control right, activates the temperature control logic unit of the temperature control chip, controls temperature, such as adjusts fan speed, based on detected temperature and fan speed by the temperature detecting unit and fan speed detecting unit, using the second temperature control strategy preset in the temperature control logic unit, sets Enable=0, and activates temperature control chip time interruption based on the timing period Ta (the second period) set in the chip time interruption timing period register. Exemplarily, the temperature control chip can take over the temperature-control control right once the system powers on.

Step b, after the system logs in operation system, the temperature control function module, such as temperature control software, is activated and takes over the temperature-control control right, wherein the temperature control software accesses the temperature control detecting unit and fan detecting and control unit of the temperature control chip through the temperature control chip, such as the driving program of the chip, and obtains system temperature and fan speed through associated temperature detecting related register and fan speed read register, and controls the fan speed based on predefined first temperature control strategy after reading the system temperature and fan speed. At the same time it sets Enable register as 1, sets Enable 2 register as 0, shuts down the default temperature control strategy of the chip, i.e., shuts down the temperature control logic unit of the chip, and activates the software interruption of the temperature control software. After activating the software interruption, the temperature control software may access the temperature control chip regularly based on a predefined software interruption timing period Tb (the first period);

Step c, when the temperature control software works normally, the temperature control software accesses the temperature control chip regularly based on the timing period Tb, and controls the temperature based on read temperature, such as adjusts the fan speed, and at the same time sets Enable=1;

Step d, the temperature control chip accesses Enable register regularly based on Ta, in which, when Enable=1, set Enable=0; when Enable=0, set Enable 2=1, and the temperature control chip takes over the temperature-control control right, activates or recovers the temperature control logic unit to control the temperature.

The above steps c, d are triggered by interruption, and do not have a fixed order of being performed.

The timing period Tb (the first period) of the software interruption is less than the timing period (the second period) of the chip time interruption. Preferably, the first period is less than half of the second period so as to ensure that the temperature control logic of the temperature control chip does not work when the temperature control software operates normally.

In the embodiment of the invention, when the temperature control software operates normally, its timing sets Enable as 1. Here, the value of Enable identifies that the temperature control software takes over the temperature-control control right at the time. In this case, the Enable value accessed by the temperature control chip must be 1 when the temperature control software works normally. Because the temperature control chip sets the Enable whose value is 1 to 0 regularly, once the temperature control software is at fault and cannot work, it cannot set Enable to 1. The temperature control chip reads that Enable is 0. Consequently, when the temperature control chip reads Enable=0, it is determined that the temperature control software is at fault and cannot work. Here, the temperature control chip may take over the temperature-control control right at once, activate or recover the temperature control logic set in the temperature control chip to control the temperature to avoid the risk of system overheating.

Exemplarily but not be limited, the temperature control logic on the chip may be pre-stored before the system powers on or be set right after powering on. So the above "recovery" is that, when the temperature control software is at fault and cannot work, the temperature control chip can recover the temperature control logic used by the temperature control chip when the system powers on.

Specifically, in step a, in order that the temperature control chip takes over the temperature-control control right when the system powers on, and activates the temperature control logic of the temperature control chip, setting Enable=0, Enable2=1 before the system powers on, or setting Enable=0, Enable2=1 right after the system powers on.

Figure 4:
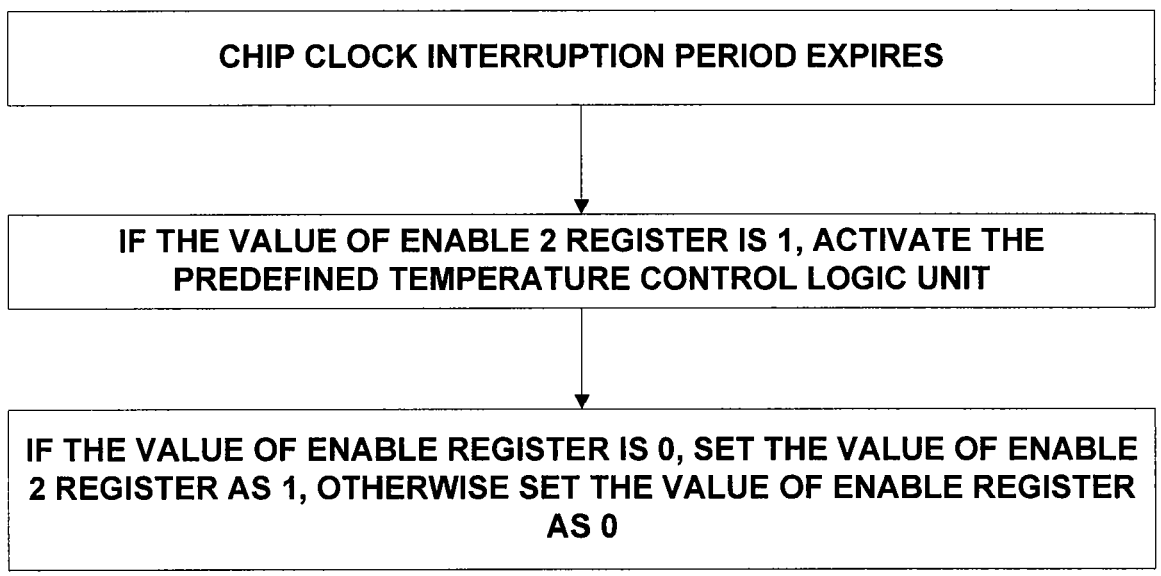
Figure 5:
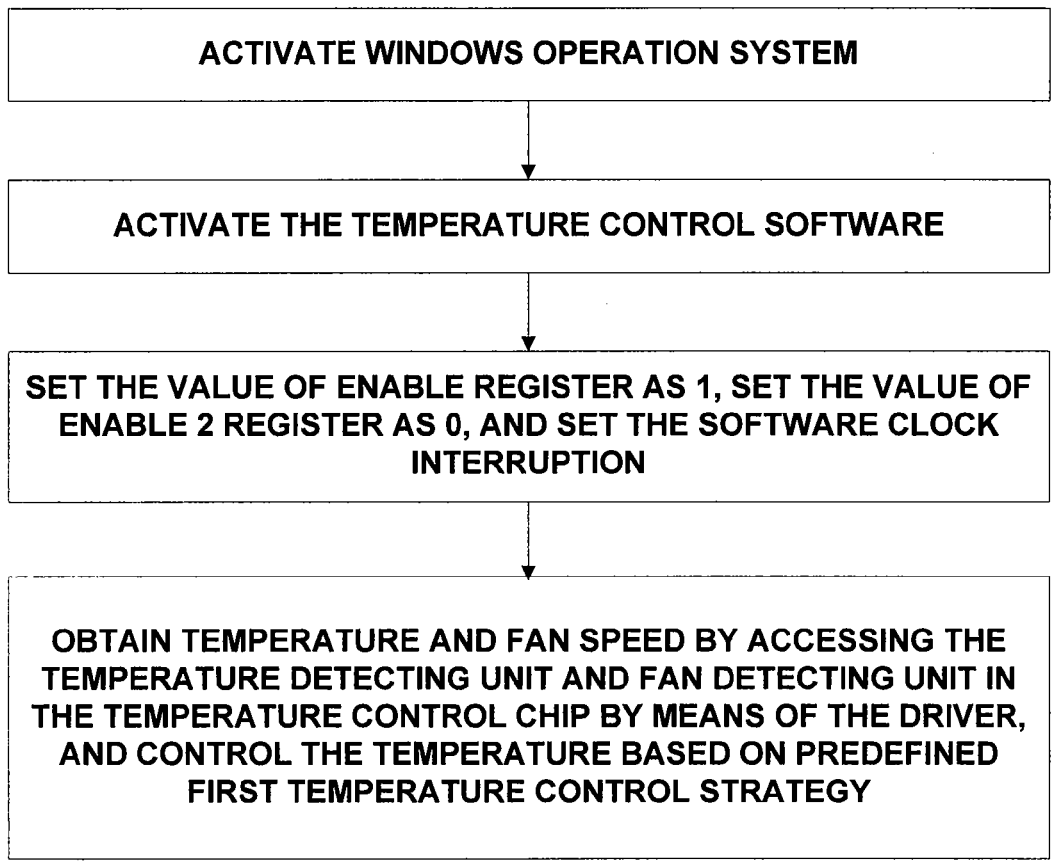
FIG. 5 is a schematic flow chart of the processing of the temperature control function module in the temperature control method according to another embodiment of the present invention.

Specifically, in the embodiment of the invention, the schematic flow charts within the temperature control chip can be seen from FIG. 3 and FIG. 4; and the schematic flow chart of Windows temperature control software can be seen from FIG. 5. The steps of FIG. 3 and FIG. 4 may correspond to steps a, b; the steps of FIG. 5 may correspond to steps b, c.

In the embodiment, if the timing unit is implemented by an embedded function module including embedded program, the above-mentioned Enable, Enable 2 and timing period can be identified by corresponding embedded program variables.

Figure 6:
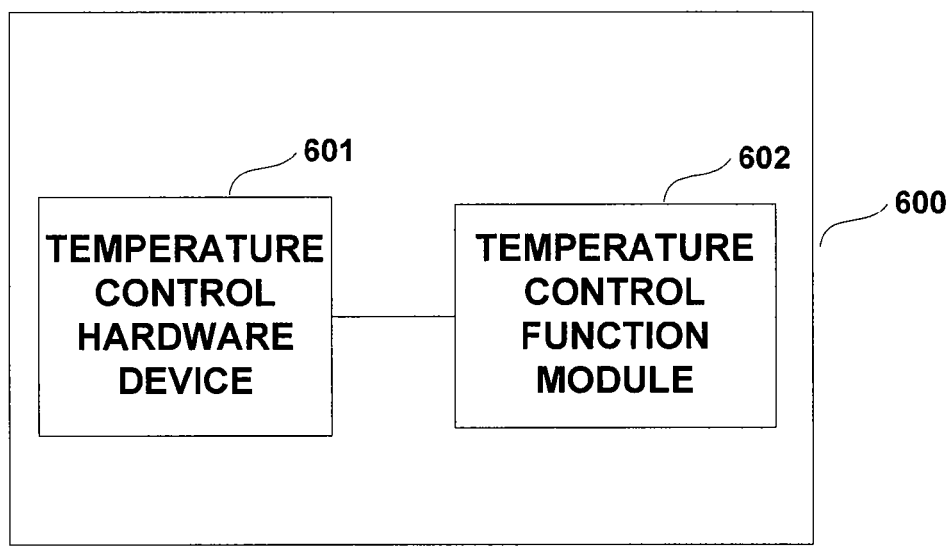
FIG. 6 is a schematic structure diagram of the temperature control system according to one embodiment of the present invention.

The embodiment of the invention also discloses a temperature control system. As shown in FIG. 6, the temperature control system 600 of the embodiment of the invention comprises: a temperature control hardware device 601 and a temperature control function module 602 based on operation system, the temperature control function module is for obtaining the temperature-control control right after logging in operation system, and controlling the system temperature based on predefined first temperature control strategy;

the temperature control hardware device is for obtaining the temperature-control control right when it is determined that the temperature control function module is at fault and stops working, and controlling the system temperature based on predefined second temperature control strategy.

Preferably, in the system of the embodiment, the temperature control hardware device comprises:

a temperature detecting unit for detecting the system temperature;

a fan detecting unit for detecting fan speed;

a temperature control logic unit for adjusting the fan speed based on detected temperature, fan speed and predefined second temperature control strategy;

a timing unit for periodically determining if the temperature control function module occurs fault, and if so, activating the temperature control logic unit.

Preferably, in the system of the embodiment, the timing unit comprises:

a control right identifier register for storing temperature-control control right identifier, which identifies the obtainer of the temperature-control control right, and can take at least two different values, corresponding to that the temperature-control control right is or is not obtained by the temperature control function module, respectively;

a temperature control function module fault determination module for periodically detecting the value of the temperature-control control right identifier based on the predefined second period, wherein if the value of the temperature-control control right identifier corresponds to that the temperature-control control right is not obtained by the temperature control function module, it is determined that the temperature control function module occurs fault, and temperature control logic unit is activated; and if the value of the temperature-control control right identifier corresponds to that the temperature-control control right is obtained by the temperature control function module, the value of the temperature-control control right identifier is changed to that the temperature-control control right is not obtained by the temperature control function module.

Preferably, the system of the embodiment further comprises:

a control right identifier setting module for setting the value of the temperature-control control right identifier to correspond to that the temperature-control control right is obtained by the temperature control function module when the temperature control function module obtains the temperature-control control right, and after the temperature control function module obtains the temperature-control control right, periodically setting the value of the temperature-control control right identifier to correspond to that the temperature-control control right is obtained by the temperature control function module based on the predefined first period, wherein the first period is less than the second period. Preferably, the first period is less than a half of the second period.

Preferably, the system of the embodiment further comprises:

a temperature control logic unit startup module, for activating the temperature control logic unit after the system powers on and before logging in the operation system.

Preferably, the system of the embodiment further comprises:

a temperature control logic unit shutdown module for shutting down the temperature control logic unit after the temperature control function module obtains the temperature-control control right.

Preferred embodiments of the present invention are disclosed as above. It should be pointed out that those skilled in the art can make various changes and modifications therein without departing from the principle of the embodiments of the present invention. Those changes and modifications are intended to be encompassed by the present protection scope.

What is claimed is:

1. A temperature control method, characterized in that the method comprises:

after a system logs in operation system, a temperature control function module obtains a temperature-control control right, and controls system temperature based on a predefined first temperature control strategy; and if it is determined that fault occurs in the temperature control function module, a temperature control hardware device obtains the temperature-control control right, and controls the system temperature based on a predefined second temperature control strategy, wherein the determination is performed by setting and detecting a temperature-control control right identifier, which identifies the obtainer of the temperature-control control right, the determination comprising:

setting that the temperature-control control right identifier at least can take two different values, corresponding to that the temperature-control control right is or isn't obtained by the temperature control function module respectively;

if the temperature control function module obtains the temperature-control control right, setting the value of the temperature-control control right identifier to correspond to that the temperature-control control right is obtained by the temperature control function module;

after the temperature control function module obtains the temperature-control control right, setting the value of the temperature-control control right identifier to correspond to that the temperature-control control right is obtained by the temperature control function module periodically based on a predefined first period; and based on a predefined second period, the temperature control hardware device periodically detecting the value of the temperature-control control right identifier, and if the value of the temperature-control control right identifier corresponds to that the temperature-control control right isn't obtained by the temperature control function module, determining that fault occurs in the temperature control function module; wherein, the first period is less than the second period.

2. The method according to claim 1, characterized in that if the value of the temperature-control control right identifier corresponds to that the temperature-control control right is obtained by the temperature control function module, the value of the temperature-control control right identifier is changed to correspond to that the temperature-control control right is not obtained by the temperature control function module.

3. The method according to claim 1, characterized in that after determining that fault occurs in the temperature control function module, activating the second temperature control strategy to control the system temperature.

4. The method according to claim 1, characterized in that the first period is less than half of the second period.

5. The method according to claim 1, characterized in that after the system powers on and before it logs in the operation system, the temperature control hardware device obtains the temperature-control control right, and controls the temperature based on the predefined second temperature control strategy.

6. The method according to claim 5, characterized in that after the temperature control function module obtains the temperature-control control right, the temperature control hardware device stops controlling the system temperature based on the predefined second temperature control strategy.

7. The method according to claim 1, characterized in that after the system powers on and before it logs in the operation system, the temperature control hardware device obtains the temperature-control control right, and controls the temperature based on the predefined second temperature control strategy.

8. A temperature control system, characterized in that the system comprises: a temperature control hardware device and a temperature control function module based on operation system, wherein
the temperature control function module is for obtaining a temperature-control control right after the operation system is logged in, and controlling system temperature based on a predefined first temperature control strategy;
the temperature control hardware device is for obtaining the temperature-control control right when it is determined that fault occurs in the temperature control function module, and controlling the system temperature based on a predefined second temperature control strategy,
wherein:
the temperature control hardware device comprises:
a temperature detecting unit for detecting the system temperature;
a fan detecting unit for detecting fan speed;
a temperature control logic unit for adjusting the fan speed based on detected temperature, fan speed and the predefined second temperature control strategy;
a timing unit for periodically determining if fault occurs in the temperature control function module, and if fault occurs in the temperature control function module, activating the temperature control logic unit, the timing unit comprising:
a control right identifier register, for storing a temperature-control control right identifier, which identifies the obtainer of the temperature-control control right, and can take at least two different values, corresponding to that the temperature-control control right is or is not obtained by the temperature control function module respectively; and
a temperature control function module fault determination module for periodically detecting the value of the temperature-control control right identifier based on the predefined second period, wherein if the value of the temperature-control control right identifier corresponds to that the temperature-control control right is not obtained by the temperature control function module, determining that fault occurs in the temperature control function module, and activating the temperature control logic unit; while if the value of the temperature-control control right identifier corresponds to that the temperature-control control right is obtained by the temperature control function module, changing the value of the temperature-control control right identifier to correspond to that the temperature-control control right is not obtained by the temperature control function module.

9. The system according to claim 8, characterized in that the system further comprises:
a temperature control logic unit startup module for activating the temperature control logic unit after the system powers on and before the system logs in the operation system.

10. The system according to claim 9, characterized in that the system further comprises:
a temperature control logic unit shutdown module for shutting down the temperature control logic unit after the temperature control function module obtains the temperature-control control right.

11. The system according to claim 8, characterized in that the system further comprises:
a temperature control logic unit shutdown module for shutting down the temperature control logic unit after the temperature control function module obtains the temperature-control control right.

12. A temperature control system, characterized in that the system comprises: a temperature control hardware device and a temperature control function module based on operation system, wherein
the temperature control function module is for obtaining a temperature-control control right after the operation system is logged in, and controlling system temperature based on a predefined first temperature control strategy;
the temperature control hardware device is for obtaining the temperature-control control right when it is determined that fault occurs in the temperature control function module, and controlling the system temperature based on a predefined second temperature control strategy,
wherein:
the temperature control hardware device comprises:
a temperature detecting unit for detecting the system temperature;
a fan detecting unit for detecting fan speed;
a temperature control logic unit for adjusting the fan speed based on detected temperature, fan speed and the predefined second temperature control strategy;
a timing unit for periodically determining if fault occurs in the temperature control function module, and if fault occurs in the temperature control function module, activating the temperature control logic unit, the timing unit comprising:
a control right identifier register, for storing a temperature-control control right identifier, which identifies the obtainer of the temperature-control control right, and can take at least two different values, corresponding to that the temperature-control control right is or is not obtained by the temperature control function module respectively; and a temperature control function module fault determination module for periodically detecting the value of the temperature-control control right identifier based on the predefined second period, wherein if the value of the temperature-control control right identifier corresponds to that the temperature-control control right is not obtained by the temperature control function module, determining that fault occurs in the temperature control function module, and activating the temperature control logic unit; while if the value of the temperature-control control right identifier corresponds to that the temperature-control control right is obtained by the temperature control function module, changing the value of the temperature-control control right identifier to correspond to that the temperature-control control right is not obtained by the temperature control function module;

the system further comprising a control right identifier setting module for setting the value of the temperature-control control right identifier to correspond to that the temperature-control control right is obtained by the temperature control function module when the temperature control function module obtains the temperature-control control right, and after the temperature control function module obtains the temperature-control control right, periodically setting the value of the temperature-control control right identifier to correspond to that the temperature-control control right is obtained by the temperature control function module based on the predefined first period, and the first period is less than the second period.

13. A temperature control hardware device, characterized in that the device comprises:

a temperature detecting unit for detecting the system temperature;

a fan detecting unit for detecting fan speed;

a temperature control logic unit for adjusting the fan speed based on detected temperature, fan speed and a predefined second temperature control strategy;

a timing unit for periodically determining if fault occurs in the temperature control function module based on the operation system, and if fault occurs in the temperature control function module, activating the temperature control logic unit, the timing unit comprising:

a control right identifier register for storing a temperature-control control right identifier, which identifies the obtainer of the temperature-control control right, and can take at least two different values, corresponding to that the temperature-control control right is or is not obtained by the temperature control function module respectively;

a temperature control function module fault determination module for periodically detecting the value of the temperature-control control right identifier based on the predefined second period, wherein if the value of the temperature-control control right identifier corresponds to that the temperature-control control right is not obtained by the temperature control function module, determining that fault occurs in the temperature control function module, and activating the temperature control logic unit; if the value of the temperature-control control right identifier corresponds to that the temperature-control control right is obtained by the temperature control function module, changing the value of the temperature-control control right identifier to correspond to that the temperature-control control right is not obtained by the temperature control function module.

* * * * *